United States Patent [19]

Cook et al.

[11] 3,933,327

[45] Jan. 20, 1976

[54] AIRCRAFT ANTI-ICING PLENUM

[75] Inventors: Leonard J. Cook, Canoga Park; Herman A. Rosenthal, San Diego, both of Calif.

[73] Assignee: Rohr Industries, Inc., Chula Vista, Calif.

[22] Filed: Aug. 30, 1974

[21] Appl. No.: 502,059

[52] U.S. Cl. ..... 244/134 B; 60/39.09 D; 244/42 CC
[51] Int. Cl.² .......................................... B64D 15/04
[58] Field of Search ........ 244/134 R, 134 B, 134 C, 244/134 A, 42 CC, 42 CE, 42 CF, 42 C; 415/116, 174, DIG. 1; 60/39.09 D; 181/33 HA

[56] References Cited
UNITED STATES PATENTS

| | | | |
|---|---|---|---|
| 2,514,105 | 7/1950 | Thomas | 244/134 B |
| 2,742,247 | 4/1956 | Lachmann | 244/42 CE X |
| 3,013,641 | 12/1961 | Compton | 244/134 R |
| 3,057,154 | 10/1962 | Sherlaw et al. | 60/39.09 D |
| 3,128,973 | 4/1964 | Dannenberg | 244/42 CE X |
| 3,566,606 | 3/1971 | Mortlock | 60/39.09 D |
| 3,820,628 | 6/1974 | Hanson | 244/42 CE X |

FOREIGN PATENTS OR APPLICATIONS

| | | | |
|---|---|---|---|
| 711,287 | 8/1941 | Germany | 244/134 B |
| 638,079 | 5/1950 | United Kingdom | 60/39.09 D |
| 1,260,986 | 2/1968 | Germany | 244/134 B |

Primary Examiner—Trygve M. Blix
Assistant Examiner—Galen L. Barefoot
Attorney, Agent, or Firm—Patrick J. Schlesinger; Frank D. Gilliam

[57] ABSTRACT

The leading edge of the jet engine nacelle is provided with structure to prevent the formation of ice particles at the inlet of the jet engine. The nacelle is split into leading and trailing chambers and there is a partition separating the chambers, the leading one of which includes the anti-icing apparatus. The leading chamber includes a double skin generally facing interiorly toward the jet engine and that double skin defines the nacelle therebetween which permits the passage of the hot gases which heat the outer skin from the inside thereof. Conduit means controllably pass hot exhaust gases from the jet engine to within the leading chamber from where they pass into a cell via a series of spaced apertures formed in the inner double skin. A series of spaced channels are formed between the inner and outer skins and connect the leading and trailing chambers. Those channels pass the spent heating gases into the trailing chamber which includes the structural acoustical sandwich comprising inner and outer skins separated by a layer of honeycomb core. The outer skin is apertured for acoustic purposes and the spent gases pass through those apertures and are discharged.

3 Claims, 2 Drawing Figures

AIRCRAFT ANTI-ICING PLENUM

BACKGROUND OF THE INVENTION

The present invention relates to anti-icing apparatus for use with jet engines and the like.

It is known in aircraft that under certain atmospheric conditions, ice tends to form and build up on any part of which air impinges. This is a particular danger at the inlet of the jet engines, since such ice may obstruct the free flow of air entering the intake and as a result, it may adversely affect the operating characteristics of such engines. In the extreme, a large build-up of ice may even damage sensitive engine components due to possible break-away and collision.

For some time, anti-icing apparatus employed in aircraft for preventing the formation of ice on faired surfaces has utilized relatively warm engine bleed air and conduits for delivering this heated air under pressure to air spaces defined by apertured fairings. With the ever increasing demand for greater engine performance, the conventional engine bleed air systems are distributing air at correspondingly greater temperatures and pressures.

The increase of engine performance cannot be effectively realized unless the overall weight of the aircraft can be maintained at a minimum level. In view of the extremely high temperature and pressure, however, it has been necessary to construct the apertured fairings from material such as steel which can withstand this excessive temperature and pressure. The use of steel for the construction of engine inlet surfaces and the like, rather than lighter aluminum and aluminum alloys, has tended to increase the overall aircraft weight thus detrimentally affecting the aircraft performance.

The present invention is designed to admit controlled amounts of this heated air at the precise position where it performs its function of heating the faired surfaces sufficiently to melt the ice particles. Because the air is admitted in controlled amounts, the faired surfaces no longer need to withstand excessive temperature levels and resort can be made to advanced aerodynamic materials which provide maximum strength at a minimum amount of weight. The present invention thus permits the engine to operate at its maximum efficiency and does not add to the weight of the craft thus making the entire craft operate at maximum efficiency.

SUMMARY OF THE INVENTION

The leading edge of the jet engine nacelle is provided with structure to prevent the formation of ice particles at the inlet of the jet engine. The nacelle is split into leading and trailing chambers and there is a partition separating the chambers, the leading one of which includes the anti-icing apparatus. The leading chamber includes a double skin generally facing interiorly toward the jet engine and that double skin defines the nacelle therebetween which permits the passage of the hot gases which heat the outer skin from the inside thereof. Conduit means controllably pass hot exhaust gases from the jet engine to within the leding chamber from where they pass into a cell via a series of spaced apertures formed in the inner double skin. A series of spaced channels are formed between the inner and outer skins and connect the leading and trailing chambers. Those channels pass the spent gases into the trailing chamber which includes the structural acoustical sandwich comprising inner and outer skins separated by a layer of honeycomb core. The outer skin is apertured for acoustic purposes and the spent gases pass through those apertures and are discharged.

The above and other aspects of the present invention will be apparent as the description continues and when read in conjunction with the appended drawings.

DETAILED DESCRIPTION OF THE DRAWINGS

Figure 1:
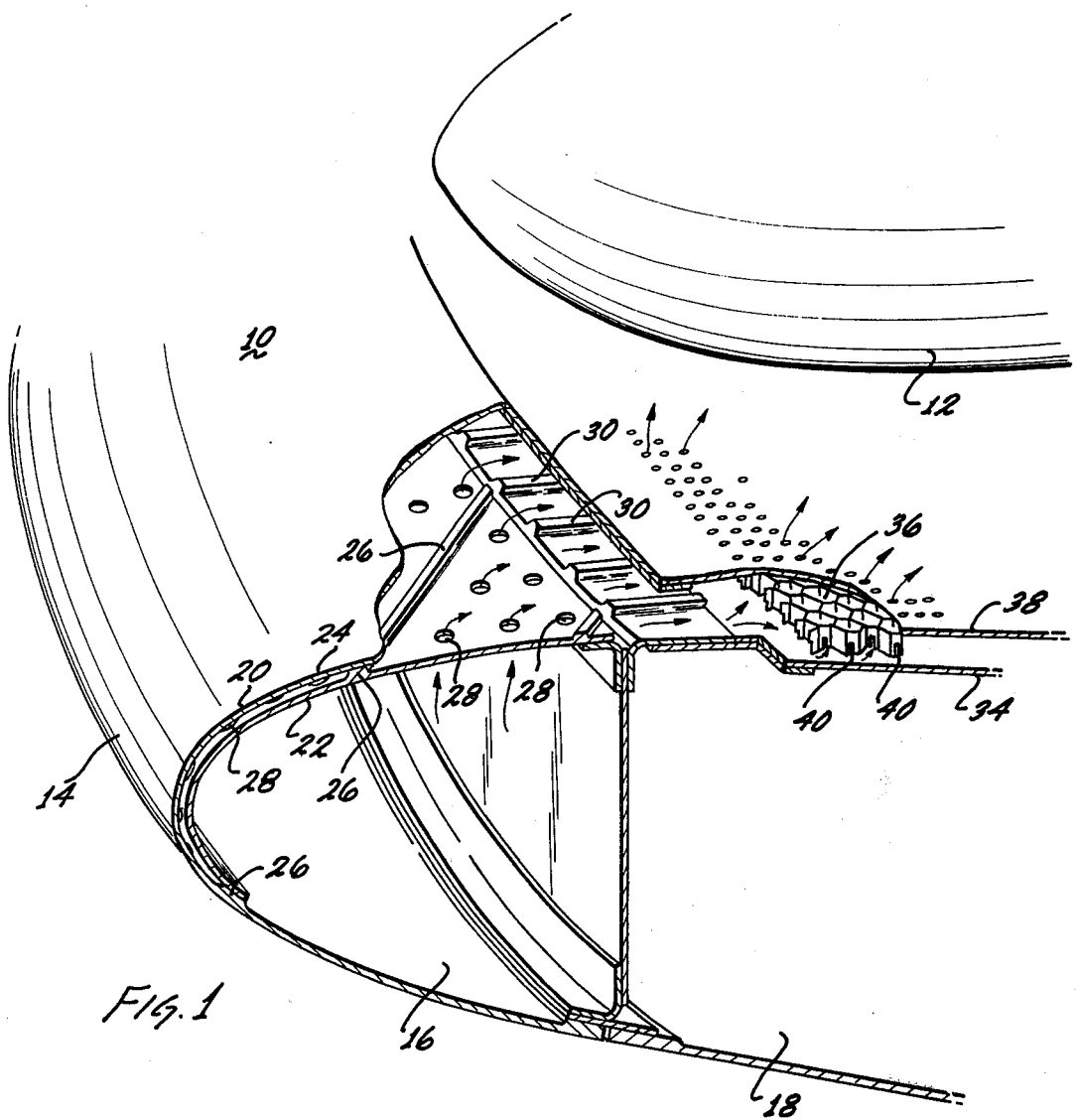
FIG. 1 is a side elevational view of a nacelle incorporating the anti-icing structure of the present invention, partially cut away to reveal the placement of that structure.
Figure 2:
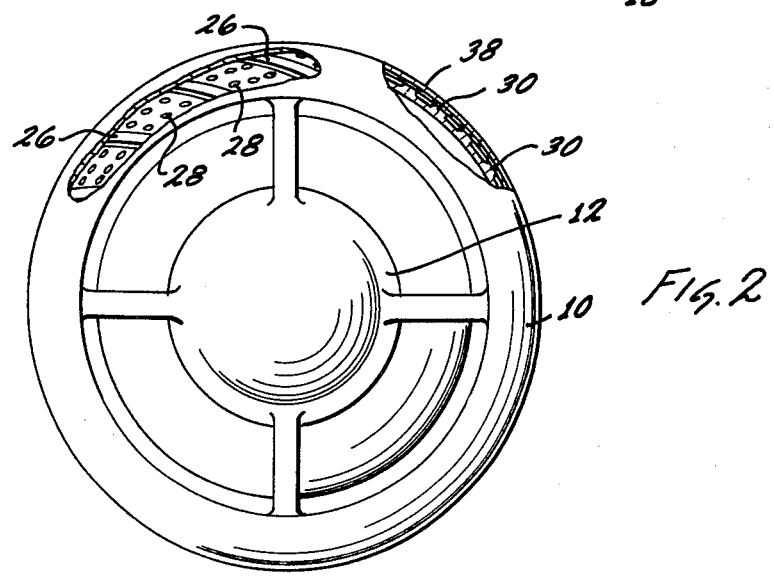
FIG. 2 is a front elevational view of the nacelle.

FIG. 1 illustrates a conventional nacelle 10 which is generally cylindrical and supports a jet engine 12 essentially in a conventional manner. Large amounts of air pass into the engine through or over the leading edge 14 of that nacelle.

The nacelle 10 is divided into leading and trailing chambers 16 and 18 respectively. It is the leading chamber 16 which is of most concern since along the forward exterior of that chamber is where the ice particles tend to form, and it is that chamber which must be heated to inhibit the formation of ice particles at the inlet of the jet engine.

Hot exhaust gases are bled from the engine exhaust into the trailing chamber 18 and via a conduit (not shown) are passed into the leading chamber 16. The conduit may be of any conventional type and will be sized to admit only that amount of gas necessary to perform the heating function in the trailing chamber. The leading chamber includes a double thick wall 20 fabricated from inner and outer skins 22 and 24 respectively. That wall is formed only along the inside of the leading chamber, or, in other words, it faces interiorly toward the jet engine. Ice particles which would form on the exterior facing wall of the leading chamber present no particular problem and for that reason, it is only the interiorly facing side that must be heated to inhibit ice particle formation.

The inner and outer walls 22 and 24 respectively, of the leading chamber 16, define therebetween a cell which is adapted to receive the bleed exhaust gases. A series of spaced ribs 26 provide for the structural connection of the inner and outer walls and to some extent further define the cell into several compartments. A series of spaced ports 28 are formed in the inner skin and provide for communication between the leading chamber and the cell. The hot bleed gases that are admitted to the cell via the ports 28 heat the outer skin 24 only to that temperature necessary to retard the formation of ice particles on the exterior of that skin. The size, spacing, and number of ports will determine just how much bleed exhaust gases are admitted into the cell. This is done in advance by the designer who would have to account for the minimum temperature encountered by the aircraft in anticipated flight patterns.

A series of parallel spaced ribs 30 define the series of channels 32 which function to discharge the spent exhaust gases from the cell into the structural acoustic sandwich which defines the trailing chamber 18 of the nacelle 10. That sandwich is conventional in nature and comprises an inner skin 34, a honeycomb cellular layer 36 and an apertured exterior skin 38, the apertures of which are provided to impart acoustical dampening properties to the nacelle. The exhaust gases pass into the sandwich and flow freely about the honeycomb layer, which flow may be assisted by the provision of slots 40 in the honeycomb walls. These gases then pass through the apertures of the exterior skin.

Many changes may be made in details of the instant invention, in the method and materials of fabrication, in the configuration and assemblage of the constituent elements, without departing from the spirit and scope of the appended claims, which changes are intended to be embraced therewithin:

We claim:

1. Anti-icing plenum to eliminate formation of ice at the leading edge of a jet engine nacelle, the nacelle being divided into leading and trailing chambers, and a partition separating said chambers, a portion of the leading and trailing chambers comprises a double skin along the side thereof generally facing interiorly toward the jet engine, said double skin defining therebetween a cell for the passage of hot gases which heat the leading chamber outer skin from the inside thereof, a series of spaced apertures formed in the inner skin of said leading chamber admit controlled amounts of hot gases into said cell, whereby said leading chamber outer skin is heated to a temperature sufficient to retard formation of ice particles at the nacelle inlet, said partition separating said chambers comprises a series of spaced channels formed between said inner and outer skins adapted to pass the spent heating gases out of said leading chamber into the trailing chamber, said inner wall of the trailing chamber comprises a structural acoustic sandwich, the intermediate layer of which comprises honeycomb cellular material, said structural acoustic sandwich comprises inner and outer skins separated by said layer of honeycomb cellular material having cells with side walls with notches therein, said side walls perpendicular to said skins, said outer skin being apertured allowing said heating gases to pass through notches cut in the side walls of the cells of said honeycomb cellular material and said apertures.

2. Anti-icing plenum to eliminate formation of ice at the leading edge of a jet engine nacelle, the nacelle being divided into leading and trailing chambers, and a partition separating said chambers, a portion of the leading and trailing chambers comprises a double skin along the side thereof generally facing interiorly toward the jet engine, said double skin defining therebetween a cell for the passage of hot gases which heat the leading chamber outer skin from the inside thereof, a series of spaced apertures formed in the inner skin of said leading chamber admit controlled amounts of hot gases into said cell, whereby said leading chamber outer skin is heated to a temperature sufficient to retard formation of ice particles at the nacelle inlet, said partition separating said chambers comprises a series of spaced channels formed between said inner and outer skins adapted to pass the spent heating gases out of said leading chamber into the trailing chamber, said inner wall of the trailing chamber comprises a structural acoustic sandwich, the intermediate layer of which comprises honeycomb cellular material, said honeycomb cellular material having cells with side walls on a plane perpendicular to said outer skin and said side walls are notched to facilitate the flow of spent gases therethrough.

3. Anti-icing plenum to eliminate the formation of ice at the leading edge of a jet engine nacelle, the nacelle being divided into leading and trailing chambers, and a partition separating said chambers, the forward end and the inner portion of said leading chamber facing the engine and the adjacent inner portion of said trailing chamber comprises a double skin, said double skin defining therebetween a cell for the passage of externally supplied hot gases which heat the outer skin of said double skin portion of said leading chamber from the inside thereof, a series of spaced apertures formed in the inner skin of said leading chamber admit controlled amounts of externally supplied hot gases into said cell, whereby the outer skin of said leading chamber is heated to a temperature sufficient to retard the formation of ice particles at the nacelle inlet, a series of spaced channels formed between said inner and outer skins of the forward portion of said trailing chamber pass the spent heating gases out of the leading chamber into said trailing chamber, said inner and outer skins of said trailing chamber adjacent said forward portion form a structural acoustic sandwich, the intermediate layer of which comprises honeycomb core material, a portion of said outer skin of said acoustic sandwich is apertured and a portion of the cells of said honeycomb core material have notches in their side walls the outer skin apertures and such notches exhaust said spent gases from said trailing chamber into said engine.

* * * * *